United States Patent
Prahlad et al.

(10) Patent No.: US 10,547,678 B2
(45) Date of Patent: Jan. 28, 2020

(54) DATA TRANSFER TECHNIQUES WITHIN DATA STORAGE DEVICES, SUCH AS NETWORK ATTACHED STORAGE PERFORMING DATA MIGRATION

(71) Applicant: Commvault Systems, Inc., Tinton Falls, NJ (US)

(72) Inventors: Anand Prahlad, Bangalore (IN); Rajiv Kottomtharayil, Marlboro, NJ (US); Manoj Kumar Vijayan, Marlboro, NJ (US); Parag Gokhale, Marlboro, NJ (US); Deepak Raghunath Attarde, Marlboro, NJ (US); Kamleshkumar K. Lad, Dublin, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 712 days.

(21) Appl. No.: 14/963,954

(22) Filed: Dec. 9, 2015

(65) Prior Publication Data

US 2016/0100007 A1 Apr. 7, 2016

Related U.S. Application Data

(63) Continuation of application No. 12/558,640, filed on Sep. 14, 2009, now abandoned.
(Continued)

(51) Int. Cl.
*H04L 29/08* (2006.01)
(52) U.S. Cl.
CPC ...... *H04L 67/1095* (2013.01); *H04L 67/1097* (2013.01); *H04L 67/2852* (2013.01)
(58) Field of Classification Search
CPC .. G06F 11/1458; G06F 3/067; G06F 11/1448; G06F 11/1469; G06F 17/30079;
(Continued)

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 14/673,278, filed Mar. 30, 2015, Kumarasamy, Paramasivam et al.
(Continued)

*Primary Examiner* — Alex Gofman
*Assistant Examiner* — Linh Black
(74) *Attorney, Agent, or Firm* — Perkins Coie LLP

(57) ABSTRACT

A stand-alone, network accessible data storage device, such as a filer or NAS device, is capable of transferring data objects based on portions of the data objects. The device transfers portions of files, folders, and other data objects from a data store within the device to external secondary storage based on certain criteria, such as time-based criteria, age-based criteria, and so on. A portion may be one or more blocks of a data object, or one or more chunks of a data object, or other segments that combine to form or store a data object. For example, the device identifies one or more blocks of a data object that satisfy a certain criteria, and migrates the identified blocks to external storage, thereby freeing up storage space within the device. The device may determine that a certain number of blocks of a file have not been modified or called by a file system in a certain time period, and migrate these blocks to secondary storage.

16 Claims, 9 Drawing Sheets

Related U.S. Application Data

(60) Provisional application No. 61/097,176, filed on Sep. 15, 2008.

(58) Field of Classification Search
CPC ......... G06F 17/30008; G06F 17/30085; G06F 2212/154; G06F 2212/263; G06F 2212/461; G06F 3/064; G06F 11/1435; G06F 11/1451; G06F 11/1471; G06F 16/11; G06F 16/119; G06F 16/16; G06F 16/1727; G06F 16/1734; Y10S 707/99955
USPC ....... 707/624, 647, 653, 662, 681, 685, 694, 707/741, 745, 822, 827
See application file for complete search history.

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,164 A | 8/1993 | Pavlidis et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,367,698 A | 11/1994 | Webber et al. |
| 5,410,700 A | 4/1995 | Fecteau et al. |
| 5,412,668 A | 5/1995 | Dewey |
| 5,448,724 A | 9/1995 | Hayashi |
| 5,455,926 A | 10/1995 | Keele et al. |
| 5,491,810 A | 2/1996 | Allen |
| 5,495,457 A | 2/1996 | Takagi |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,608,865 A | 3/1997 | Midgely et al. |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,815,662 A | 9/1998 | Ong |
| 5,832,522 A | 11/1998 | Blickenstaff et al. |
| 5,860,068 A | 1/1999 | Cook |
| 5,875,478 A | 2/1999 | Blumenau |
| 5,875,481 A | 2/1999 | Ashton et al. |
| 5,887,134 A | 3/1999 | Ebrahim |
| 5,893,139 A | 4/1999 | Kamiyama |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 5,983,239 A | 11/1999 | Cannon |
| 6,014,695 A | 1/2000 | Hirose et al. |
| 6,021,415 A | 2/2000 | Cannon et al. |
| 6,023,705 A | 2/2000 | Bellinger et al. |
| 6,026,398 A | 2/2000 | Brown et al. |
| 6,026,414 A | 2/2000 | Anglin |
| 6,052,735 A | 4/2000 | Ulrich et al. |
| 6,076,148 A | 6/2000 | Kedem |
| 6,088,694 A | 7/2000 | Burns et al. |
| 6,094,416 A | 7/2000 | Ying |
| 6,131,095 A | 10/2000 | Low et al. |
| 6,131,099 A | 10/2000 | Johnson et al. |
| 6,131,147 A | 10/2000 | Takagi |
| 6,131,190 A | 10/2000 | Sidwell |
| 6,137,864 A | 10/2000 | Yaker |
| 6,148,412 A | 11/2000 | Cannon et al. |
| 6,149,316 A | 11/2000 | Harari et al. |
| 6,154,738 A | 11/2000 | Call |
| 6,154,787 A | 11/2000 | Urevig et al. |
| 6,161,111 A | 12/2000 | Mutalik et al. |
| 6,167,402 A | 12/2000 | Yeager |
| 6,195,794 B1 | 2/2001 | Buxton |
| 6,212,512 B1 | 4/2001 | Barney et al. |
| 6,223,205 B1 | 4/2001 | Harchol-Balter |
| 6,246,882 B1 | 6/2001 | Lachance |
| 6,260,069 B1 | 7/2001 | Anglin |
| 6,266,678 B1 | 7/2001 | McDevitt et al. |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,338,006 B1 | 1/2002 | Jesionowski et al. |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,901 B1 | 3/2002 | MacLeod et al. |
| 6,366,900 B1 | 4/2002 | Hu |
| 6,374,336 B1 | 4/2002 | Peters et al. |
| 6,389,432 B1 | 5/2002 | Pothapragada et al. |
| 6,418,441 B1 | 7/2002 | Call |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,490,666 B1 | 12/2002 | Cabrera et al. |
| 6,496,744 B1 | 12/2002 | Cook |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,550,057 B1 | 4/2003 | Bowman-Amuah |
| 6,564,228 B1 | 5/2003 | O'Connor |
| 6,615,349 B1 | 9/2003 | Hair |
| 6,616,047 B2 | 9/2003 | Catan |
| 6,658,436 B2 | 12/2003 | Oshinsky et al. |
| 6,658,526 B2 | 12/2003 | Nguyen et al. |
| 6,662,281 B2 | 12/2003 | Ballard et al. |
| 6,669,832 B1 | 12/2003 | Saito et al. |
| 6,674,924 B2 | 1/2004 | Wright |
| 6,704,839 B2 | 3/2004 | Butterworth et al. |
| 6,721,334 B1 | 4/2004 | Ketcham |
| 6,732,293 B1 | 5/2004 | Schneider |
| 6,757,794 B2 | 6/2004 | Cabrera et al. |
| 6,771,595 B1 | 8/2004 | Gilbert et al. |
| 6,785,078 B2 | 8/2004 | Basham et al. |

(56) References Cited

U.S. PATENT DOCUMENTS

| | | |
|---|---|---|
| 6,789,161 B1 | 9/2004 | Blendermann et al. |
| 6,802,025 B1 | 10/2004 | Thomas et al. |
| 6,820,035 B1 | 11/2004 | Zahavi |
| 6,851,031 B2 | 2/2005 | Trimmer et al. |
| 6,862,622 B2 | 3/2005 | Jorgensen |
| 6,909,356 B2 | 6/2005 | Brown et al. |
| 6,922,687 B2 | 7/2005 | Vernon |
| 6,934,879 B2 | 8/2005 | Misra et al. |
| 6,941,370 B2 | 9/2005 | Boies et al. |
| 6,950,723 B2 | 9/2005 | Gallo et al. |
| 6,968,351 B2 | 11/2005 | Butterworth |
| 6,968,479 B2 | 11/2005 | Wyatt et al. |
| 6,972,918 B2 | 12/2005 | Kokami et al. |
| 6,973,369 B2 | 12/2005 | Trimmer et al. |
| 6,973,553 B1 | 12/2005 | Archibald, Jr. et al. |
| 6,983,351 B2 | 1/2006 | Gibble et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,034,683 B2 | 4/2006 | Ghazarian |
| 7,035,880 B1 | 4/2006 | Crescenti et al. |
| 7,058,649 B2 | 6/2006 | Ough et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 * | 9/2006 | Ofek ............... G06F 11/1451 707/999.202 |
| 7,118,034 B2 | 10/2006 | Baldassari et al. |
| 7,120,823 B2 | 10/2006 | Foster et al. |
| 7,130,970 B2 | 10/2006 | Devassy et al. |
| 7,136,720 B2 | 11/2006 | Deckers |
| 7,146,377 B2 | 12/2006 | Nowicki et al. |
| 7,155,465 B2 | 12/2006 | Lee et al. |
| 7,155,486 B2 | 12/2006 | Aoshima et al. |
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,165,059 B1 | 1/2007 | Shah et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | van Rietschote et al. |
| 7,209,949 B2 | 4/2007 | Mousseau et al. |
| 7,213,118 B2 | 5/2007 | Goodman et al. |
| 7,216,244 B2 | 5/2007 | Amano |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,251,218 B2 | 7/2007 | Jorgensen |
| 7,275,063 B2 | 9/2007 | Horn |
| 7,277,246 B2 | 10/2007 | Barbian et al. |
| 7,277,953 B2 | 10/2007 | Wils et al. |
| 7,281,032 B2 | 10/2007 | Kodama |
| 7,287,047 B2 | 10/2007 | Kavuri |
| 7,293,133 B1 * | 11/2007 | Colgrove ............. G06F 3/0608 711/111 |
| 7,302,540 B1 | 11/2007 | Holdman et al. |
| 7,315,923 B2 | 1/2008 | Retnamma et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,379,850 B2 | 5/2008 | Sprogis et al. |
| 7,395,282 B1 | 7/2008 | Crescenti et al. |
| 7,395,387 B2 | 7/2008 | Berkowitz et al. |
| 7,395,446 B2 | 7/2008 | Luke et al. |
| 7,398,524 B2 | 7/2008 | Shapiro |
| 7,401,728 B2 | 7/2008 | Markham et al. |
| 7,412,433 B2 | 8/2008 | Anglin et al. |
| 7,418,464 B2 | 8/2008 | Cannon et al. |
| 7,421,312 B2 | 9/2008 | Trossell |
| 7,434,090 B2 | 10/2008 | Hartung et al. |
| 7,447,907 B2 | 11/2008 | Hart, III et al. |
| 7,451,283 B2 | 11/2008 | Chen |
| 7,454,569 B2 | 11/2008 | Kavuri et al. |
| 7,467,167 B2 | 12/2008 | Patterson |
| 7,472,238 B1 | 12/2008 | Gokhale et al. |
| 7,500,053 B1 | 3/2009 | Kavuri et al. |
| 7,529,782 B2 | 5/2009 | Prahlad et al. |
| 7,536,424 B2 | 5/2009 | Barzilai et al. |
| 7,539,702 B2 | 5/2009 | Deshmukh et al. |
| 7,539,783 B2 | 5/2009 | Kochunni et al. |
| 7,565,340 B2 | 7/2009 | Herlocker et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,613,752 B2 * | 11/2009 | Prahlad ............. G06F 16/24575 |
| 7,617,262 B2 | 11/2009 | Prahlad et al. |
| 7,617,392 B2 | 11/2009 | Hair |
| 7,627,617 B2 | 12/2009 | Kavuri et al. |
| 7,644,245 B2 | 1/2010 | Prahlad et al. |
| 7,653,671 B2 | 1/2010 | Ikezawa et al. |
| 7,657,666 B2 | 2/2010 | Kottomtharayil et al. |
| 7,659,820 B2 | 2/2010 | Schnee et al. |
| 7,660,812 B2 | 2/2010 | Findlay et al. |
| 7,680,843 B1 | 3/2010 | Panchbudhe et al. |
| 7,689,510 B2 | 3/2010 | Lamkin et al. |
| 7,693,832 B2 | 4/2010 | Vargas et al. |
| 7,702,659 B2 | 4/2010 | Ban et al. |
| 7,702,831 B2 | 4/2010 | Ma et al. |
| 7,707,060 B2 | 4/2010 | Chainer et al. |
| 7,712,094 B2 | 5/2010 | Shapiro |
| 7,720,817 B2 | 5/2010 | Stager et al. |
| 7,734,669 B2 | 6/2010 | Kottomtharayil et al. |
| 7,739,450 B2 | 6/2010 | Kottomtharayil |
| 7,747,579 B2 | 6/2010 | Prahlad et al. |
| 7,748,610 B2 | 7/2010 | Bell et al. |
| 7,751,628 B1 | 7/2010 | Reisman |
| 7,765,167 B2 | 7/2010 | Prahlad et al. |
| 7,765,369 B1 | 7/2010 | Prahlad et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,822,715 B2 | 10/2010 | Petruzzo |
| 7,831,566 B2 | 11/2010 | Kavuri et al. |
| 7,840,537 B2 | 11/2010 | Gokhale et al. |
| 7,844,573 B2 | 11/2010 | Amarendran et al. |
| 7,849,266 B2 | 12/2010 | Kavuri et al. |
| 7,861,011 B2 | 12/2010 | Kottomtharayil et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,889,847 B2 | 2/2011 | Gainsboro |
| 7,890,796 B2 | 2/2011 | Pawar et al. |
| 7,904,350 B2 | 3/2011 | Ayala et al. |
| 7,917,473 B2 | 3/2011 | Kavuri et al. |
| 7,917,695 B2 | 3/2011 | Ulrich et al. |
| 7,934,071 B2 | 4/2011 | Abe et al. |
| 7,937,365 B2 | 5/2011 | Prahlad et al. |
| 7,937,393 B2 | 5/2011 | Prahlad et al. |
| 7,945,810 B2 | 5/2011 | Soran et al. |
| 7,953,802 B2 | 5/2011 | Mousseau et al. |
| 7,966,293 B1 | 6/2011 | Owara et al. |
| 7,969,306 B2 | 6/2011 | Ebert et al. |
| 7,975,061 B1 | 7/2011 | Gokhale et al. |
| 7,987,319 B2 | 7/2011 | Kottomtharayil |
| 8,005,913 B1 | 8/2011 | Carlander |
| 8,006,111 B1 | 8/2011 | Tzelnic et al. |
| 8,032,569 B2 | 10/2011 | Oshita et al. |
| 8,040,727 B1 | 10/2011 | Harari |
| 8,051,043 B2 | 11/2011 | Young |

(56) References Cited

U.S. PATENT DOCUMENTS

| | | |
|---|---|---|
| 8,112,605 B2 | 2/2012 | Kavuri |
| 8,341,182 B2 | 2/2012 | Muller |
| 8,140,786 B2 | 3/2012 | Bunte et al. |
| 8,156,086 B2 | 4/2012 | Lu et al. |
| 8,161,318 B2 | 4/2012 | D'Souza et al. |
| 8,170,995 B2 | 5/2012 | Prahlad et al. |
| 8,195,800 B2 | 6/2012 | Tameshige et al. |
| 8,200,638 B1 | 6/2012 | Zheng et al. |
| 8,204,862 B1 | 6/2012 | Paulzagade et al. |
| 8,209,293 B2 | 6/2012 | Gokhale et al. |
| 8,219,524 B2 | 7/2012 | Gokhale |
| 8,229,954 B2 | 7/2012 | Kottomtharayil et al. |
| 8,230,066 B2 | 7/2012 | Heil |
| 8,230,171 B2 | 7/2012 | Kottomtharayil |
| 8,230,195 B2 | 7/2012 | Amarendran et al. |
| 8,234,417 B2 | 7/2012 | Kottomtharayil et al. |
| 8,234,468 B1 | 7/2012 | Deshmukh et al. |
| 8,244,841 B2 | 8/2012 | Shaji et al. |
| 8,266,406 B2 | 9/2012 | Kavuri |
| 8,266,615 B2 | 9/2012 | Shapiro |
| 8,285,681 B2 * | 10/2012 | Prahlad .............. G06F 17/302 707/640 |
| 8,285,898 B2 | 10/2012 | Amit et al. |
| 8,306,926 B2 | 11/2012 | Prahlad |
| 8,307,177 B2 | 11/2012 | Prahlad |
| 8,327,050 B2 | 12/2012 | Amit et al. |
| 8,335,789 B2 | 12/2012 | Hull |
| 8,346,733 B2 | 1/2013 | Gokhale |
| 8,346,734 B2 | 1/2013 | Muller |
| 8,347,088 B2 | 1/2013 | Moore et al. |
| 8,352,433 B2 | 1/2013 | Crescenti |
| 8,364,652 B2 | 1/2013 | Vijayan et al. |
| 8,402,000 B2 | 3/2013 | Gokhale et al. |
| 8,407,190 B2 | 3/2013 | Prahlad et al. |
| 8,412,848 B2 | 4/2013 | Therrien et al. |
| 8,417,678 B2 | 4/2013 | Bone et al. |
| 8,422,733 B2 | 4/2013 | Reisman et al. |
| 8,433,679 B2 | 4/2013 | Crescenti |
| 8,463,753 B2 | 6/2013 | Gokhale |
| 8,463,994 B2 | 6/2013 | Kottomtharayil |
| 8,478,876 B2 | 7/2013 | Paul et al. |
| 8,484,165 B2 | 7/2013 | Gokhale |
| 8,510,573 B2 | 8/2013 | Muller |
| 8,527,549 B2 | 9/2013 | Cidon et al. |
| 8,539,118 B2 | 9/2013 | Kottomtharayil et al. |
| 8,572,330 B2 | 10/2013 | Kottomtharayil |
| 8,578,120 B2 | 11/2013 | Attarde |
| 8,600,998 B1 | 12/2013 | Jobanputra et al. |
| 8,620,286 B2 | 12/2013 | Stannard et al. |
| 8,626,128 B2 | 1/2014 | Limont et al. |
| 8,635,204 B1 | 1/2014 | Xie et al. |
| 8,656,068 B2 | 2/2014 | Kottomtharayil et al. |
| 8,661,216 B2 | 2/2014 | Kavuri et al. |
| 8,671,209 B2 | 3/2014 | Awano |
| 8,688,641 B1 | 4/2014 | Cook et al. |
| 8,695,058 B2 | 4/2014 | Batchu et al. |
| 8,700,578 B1 | 4/2014 | Varadan et al. |
| 8,706,976 B2 | 4/2014 | Vijayan et al. |
| 8,712,959 B1 | 4/2014 | Lim et al. |
| 8,756,203 B2 | 6/2014 | Muller et al. |
| 8,825,591 B1 | 9/2014 | Lai et al. |
| 8,832,031 B2 | 9/2014 | Kavuri et al. |
| 8,832,044 B1 | 9/2014 | Gipp et al. |
| 8,849,761 B2 | 9/2014 | Kottomtharayil et al. |
| 8,850,140 B2 | 9/2014 | Freedman et al. |
| 8,886,853 B2 | 11/2014 | Vijayan et al. |
| 8,924,428 B2 | 12/2014 | Muller et al. |
| 8,931,107 B1 | 1/2015 | Brandwine |
| 8,938,481 B2 * | 1/2015 | Kumarasamy .... G06F 17/30575 707/679 |
| 8,996,823 B2 | 3/2015 | Kottomtharayil et al. |
| 9,069,799 B2 | 6/2015 | Vijayan |
| 9,183,560 B2 * | 11/2015 | Abelow ................ G06Q 10/067 |
| 10,185,670 B2 * | 1/2019 | Litichever ............ G06F 21/56 |
| 10,341,285 B2 * | 7/2019 | Warfield |
| 2002/0010661 A1 | 1/2002 | Waddington et al. |
| 2002/0032613 A1 | 3/2002 | Buettgenbach et al. |
| 2002/0049778 A1 | 4/2002 | Bell et al. |
| 2002/0069324 A1 | 6/2002 | Gerasimov et al. |
| 2002/0087950 A1 | 7/2002 | Brodeur et al. |
| 2003/0055671 A1 | 3/2003 | Nassar |
| 2003/0065759 A1 | 4/2003 | Britt et al. |
| 2003/0101155 A1 | 5/2003 | Gokhale et al. |
| 2003/0134619 A1 | 7/2003 | Phillips et al. |
| 2003/0220901 A1 | 11/2003 | Carr et al. |
| 2004/0054607 A1 | 3/2004 | Waddington et al. |
| 2004/0073677 A1 | 4/2004 | Honma et al. |
| 2004/0083202 A1 | 4/2004 | Mu et al. |
| 2004/0107199 A1 | 6/2004 | Dalrymple, III et al. |
| 2004/0186847 A1 | 9/2004 | Rappaport et al. |
| 2004/0192260 A1 | 9/2004 | Sugimoto et al. |
| 2004/0193953 A1 | 9/2004 | Callahan et al. |
| 2005/0008163 A1 | 1/2005 | Leser et al. |
| 2005/0021524 A1 | 1/2005 | Oliver |
| 2005/0033913 A1 | 2/2005 | Kottomtharayil et al. |
| 2005/0039069 A1 | 2/2005 | Prahlad et al. |
| 2005/0076264 A1 | 4/2005 | Rowan et al. |
| 2005/0102203 A1 | 5/2005 | Keong |
| 2005/0125807 A1 | 6/2005 | Brady et al. |
| 2005/0174869 A1 | 8/2005 | Kottomtharayil et al. |
| 2005/0177828 A1 | 8/2005 | Graham et al. |
| 2005/0210304 A1 | 9/2005 | Hartung et al. |
| 2005/0246342 A1 | 11/2005 | Vernon |
| 2006/0004639 A1 | 1/2006 | O'Keefe |
| 2006/0004675 A1 | 1/2006 | Bennett et al. |
| 2006/0011720 A1 | 1/2006 | Call |
| 2006/0069886 A1 | 3/2006 | Tulyani et al. |
| 2006/0075007 A1 | 4/2006 | Anderson et al. |
| 2006/0095385 A1 | 5/2006 | Atkinson et al. |
| 2006/0100912 A1 | 5/2006 | Kumar et al. |
| 2006/0161879 A1 | 7/2006 | Lubrecht et al. |
| 2006/0169769 A1 | 8/2006 | Boyarsky et al. |
| 2006/0224846 A1 | 10/2006 | Amarendran et al. |
| 2006/0248165 A1 | 11/2006 | Sridhar et al. |
| 2006/0282194 A1 | 12/2006 | Schaefer et al. |
| 2006/0288044 A1 | 12/2006 | Kashiwagi et al. |
| 2007/0130105 A1 | 6/2007 | Papatla |
| 2007/0185912 A1 | 8/2007 | Gupta et al. |
| 2008/0077622 A1 | 3/2008 | Keith et al. |
| 2008/0147621 A1 | 6/2008 | Newman et al. |
| 2008/0177806 A1 | 7/2008 | Cannon et al. |
| 2008/0243795 A1 | 10/2008 | Prahlad et al. |
| 2009/0319534 A1 | 12/2009 | Gokhale |
| 2010/0030528 A1 | 2/2010 | Smith et al. |
| 2010/0070466 A1 | 3/2010 | Prahlad et al. |
| 2010/0070474 A1 | 3/2010 | Lad |
| 2010/0070726 A1 | 3/2010 | Ngo et al. |
| 2010/0077453 A1 | 3/2010 | Mohanty et al. |
| 2010/0082672 A1 | 4/2010 | Kottomtharayil et al. |
| 2010/0269164 A1 | 10/2010 | Sosnosky et al. |
| 2010/0318500 A1 | 12/2010 | Murphy et al. |
| 2010/0333116 A1 | 12/2010 | Prahlad et al. |
| 2011/0040736 A1 | 2/2011 | Kalaboukis et al. |
| 2011/0093672 A1 | 4/2011 | Gokhale et al. |
| 2011/0231852 A1 | 9/2011 | Gokhale et al. |
| 2011/0252071 A1 | 10/2011 | Cidon |
| 2011/0270833 A1 | 11/2011 | von Kaenel et al. |
| 2011/0306326 A1 | 12/2011 | Reed et al. |
| 2012/0084523 A1 | 4/2012 | Littlefield et al. |
| 2012/0150818 A1 | 6/2012 | Vijayan Retnamma et al. |
| 2012/0150826 A1 | 6/2012 | Vijayan Retnamma et al. |
| 2012/0185657 A1 | 7/2012 | Gokhale et al. |
| 2012/0240183 A1 | 9/2012 | Sinha et al. |
| 2013/0054533 A1 | 2/2013 | Hao et al. |
| 2013/0238572 A1 | 9/2013 | Prahlad et al. |
| 2013/0262392 A1 | 10/2013 | Vibhor et al. |
| 2013/0275380 A1 | 10/2013 | Gokhale et al. |
| 2013/0318207 A1 | 11/2013 | Dotter et al. |
| 2014/0046904 A1 | 2/2014 | Kumarasamy et al. |
| 2014/0122435 A1 | 5/2014 | Chavda et al. |
| 2015/0012495 A1 | 1/2015 | Prahlad et al. |
| 2015/0269035 A1 | 9/2015 | Vijayan et al. |

(56) References Cited

U.S. PATENT DOCUMENTS

FOREIGN PATENT DOCUMENTS

| EP | 0467546 | A2 | 1/1992 |
|---|---|---|---|
| EP | 0620553 | A1 | 10/1994 |
| EP | 0757317 | A2 | 2/1997 |
| EP | 0774715 | A1 | 5/1997 |
| EP | 0809184 | A1 | 11/1997 |
| EP | 0899662 | A1 | 3/1999 |
| EP | 0981090 | A1 | 2/2000 |
| JP | 7254204 | A | 10/1995 |
| JP | 9044381 | A | 2/1997 |
| JP | 9081424 | A | 3/1997 |
| WO | 9513580 | A1 | 5/1995 |
| WO | 9912098 | A1 | 3/1999 |
| WO | 2005024573 | A2 | 3/2005 |
| WO | 2008154448 | A2 | 12/2008 |

OTHER PUBLICATIONS

U.S. Appl. No. 14/843,075, filed Sep. 2, 2015, Kochunni, Jaidev O., et al.
About Backupify [retrieved on Aug. 1, 2014], Retrieved from internet: http://web.archive.org/web/20120122064518/https://www.backupify.com/about; published on Jan. 22, 2012 as per Wayback Machine.
Allen, "Probability, Statistics and Queuing Theory," (1978), p. 370, col. 19, Lines 3-33, 2 pages.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Ashton et al., "Two Decades of policy-based storage management for the IBM mainframe computer", www.research.ibm.com, published Apr. 10, 2003, printed Jan. 3, 2009, 19 pages.
Backup your social media content with MyCube Vault [retrieved on Oct. 30, 2014] Retrieved from internet; http://web.archive.org/web/20110606160223/http://www.kullin.net/2010/11/backup-your-social-media-content-with-mycube-vault/; published on Jun. 6, 2011 as per Wayback Machine.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Campbell, C.: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006], 6 pages.
Carrington, D.: "Backups Using the "at" Command", Internet Publication, [Online] May 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 22, 2006], 1 page.
Cook, P.: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&q=%22ntbackup+eject%22+at&rnum=1&hl=de#0ab1d93a6f91b511> [retrieved on Aug. 22, 2006], 1 page.
Eitel, "Backup and Storage Management in Distributed Heterogeneous Environments," IEEE, Jun. 12-16, 1994, pp. 124-126.
Extended European Search Report in European Application No. 13767340.6, dated Aug. 19, 2015, 7 pages.
Gait, J., "The Optical File Cabinet: A Random-Access File System For Write-Once Optical Disks," IEEE Computer, vol. 21, No. 6, pp. 11-22 (Jun. 1988).
Gonzalez-Seco, Jose, "A Genetic Algorithm as the Learning Procedure for Neural Networks," International Joint Conference on Neural Networks, Jun. 1992, 356 pages.
Indian First Examination Report, Application No. 3362/DELNP/2006, dated Jan. 21, 2013, 2 pages.
International Search Report and Written Opinion for International Application No. PCT/US2013/029393; dated Jun. 27, 2013; 10 pages.
Jander, M., "Launching Storage-Area Net," Data Communications, US, McGraw Hill, NY, vol. 27, No. 4 (Mar. 21, 1998), pp. 64-72.
MDM: "Automatically eject tape", Internet Publication, [Online] Jun. 7, 1999, Retrieved from Internet: URL: <http://groups.google.de/group/microsoft.public.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006], 1 page.
PageFreezer Website Archiving & Social Media Archiving [retrieved on Aug. 1, 2014], Retrieved from internet: http://webarchive.org/web/20120303012345/http://pagefreezer.com/blog; published on Mar. 3, 2012 as per Wayback Machine.
Recycle Bin (Windows), Aug. 2007, Wikipedia, pp. 1-3.
Rosenblum et al., "The Design and Implementation of a Log-Structured File System," Operating Systems Review SIGOPS, vol. 25, No. 5, New York, US, pp. 1-15 (May 1991).
Savill, J., "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006], 8 pages.
Supplementary European Search Report in European Application No. 13767340.6, dated Sep. 4, 2015, 1 page.

\* cited by examiner

DATA TRANSFER TECHNIQUES WITHIN DATA STORAGE DEVICES, SUCH AS NETWORK ATTACHED STORAGE PERFORMING DATA MIGRATION

CROSS-REFERENCE TO RELATED APPLICATION

This application is a continuation of U.S. patent application Ser. No. 12/558,640 filed Sep. 14, 2009 (entitled DATA TRANSFER TECHNIQUES WITHIN DATA STORAGE DEVICES, SUCH AS NETWORK ATTACHED STORAGE PERFORMING DATA MIGRATION), which claims priority to U.S. Provisional Patent Application No. 61/097,176 filed Sep. 15, 2008 (entitled DATA TRANSFER TECHNIQUES WITHIN DATA STORAGE DEVICES, SUCH AS NETWORK ATTACHED STORAGE PERFORMING DATA MIGRATION), the entirety of each of which is incorporated by reference herein.

BACKGROUND

Networked attached storage (NAS), often refers to a computing system, attached to a network, which provides file-based data storage services to other devices on the network. A NAS system, or NAS device, may include a file system (e.g., under Microsoft Windows) that manages the data storage services, but is generally controlled by other resources via an IP address or other communication protocol. A NAS device may also include an operating system, although the operating system is often configured only to facilitate operations performed by the NAS system. Mainly, a NAS device includes one or more redundantly arranged hard disks, such as RAID arrays. A NAS device works with various file-based and/or communication protocols, such as NFS (Network File System) for UNIX or LINUX systems, SMB/CIFS (Server Message Block/Common Internet File System) for Windows systems, or iSCSI (Internet SCSI) for IP communications.

NAS devices provide a few similar functionalities to Storage Area Networks (SANs), although typical NAS devices only facilitate file level storage. Some hybrid systems exist, which provide both NAS and SAN functionalities. However, in these hybrid systems, such as Openfiler on LINUX, the NAS device serves the SAN device at the file level, and not at a file system level, such as at the individual file level. For example, the assignee's U.S. Pat. No. 7,546,324, entitled Systems and Methods for Performing Storage Operations Using Network Attached Storage, describes how individual files in a NAS device can be written to secondary storage, and are replaced in the NAS device with a stub having a pointer to the secondary storage location where the file now resides.

A NAS device may provide centralized storage to client computers on a network, but may also assist in load balancing and fault tolerance for resources such as email and/or web server systems. Additionally, NAS devices are generally smaller and easy to install to a network.

NAS device performance generally depends on traffic and the speed of the traffic on the attached network, as well as the capacity of a cache memory on the NAS device. Because a NAS device supports multiple protocols and contains reduced processing and operating systems, its performance may suffer when many users or many operations attempt to utilize the NAS device. The contained hardware intrinsically limits a typical NAS device, because it is self-contained and self-supported. For example, the capacity of its local memory may limit a typical NAS device's ability to provide data storage to a network, among other problems.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

Figure 1:
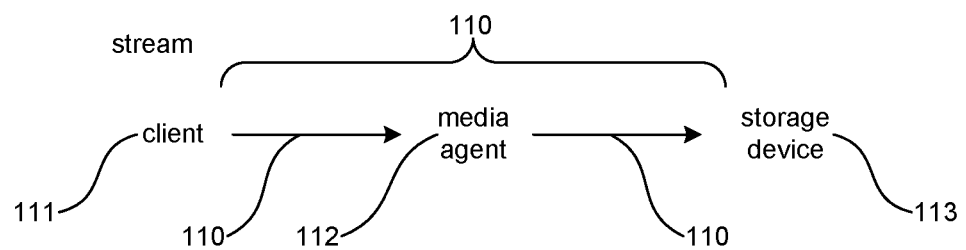
FIG. 1 is a block diagram illustrating components of a data stream utilized by a suitable data storage system.

Described in detail herein is a system and method that transfers or migrates data objects within a stand-alone network storage device, such as a filer or network-attached storage (NAS) device. In some examples, a NAS device transfers segments, portions, increments, or proper subsets of data objects stored in local memory of the NAS device. The NAS device may transfer portions of files, folders, and other data objects from a cache to secondary storage based on certain criteria, such as time-based criteria, age-based criteria, and so on. A portion may be one or more blocks of a data object, or one or more chunks of a data object, or other data portions that combine to form, store, and/or contain a data object, such as a file.

In some examples, the NAS device performs block-based migration of data. A data migration component within the NAS device identifies one or more blocks of a data object stored in a cache or data storage that satisfy a certain criteria, and migrates the identified blocks. For example, the data migration component may determine that a certain number of blocks of a file have not been modified or called by a file system within a certain time period, and migrate these blocks to secondary storage. The data migration component then maintains the other blocks of the file in primary storage. In some cases, the data migration component automatically migrates data without requiring user input. Additionally, the migration may be transparent to a user.

In some examples, the NAS device performs chunk-based migration of data. A chunk is, for example, a group or set of blocks. One or more chunks may comprise a portion of a file, folder, or other data object. The data migration component identifies one or more chunks of a data object that satisfy a certain criteria, and migrates the identified chunks. For example, the data migration component may determine that a certain number of chunks of a file have not been modified or called by a file system in a certain time period, and migrate these chunks to secondary storage. The system then maintains the other chunks of the file in the cache or data storage of the NAS device.

Network-attached storage, such as a filer or NAS device, and associated data migration components and processes, will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section. A suitable data storage system will first be described, followed by a description of suitable stand-alone devices. Following that, various data migration and data recovery processes will be discussed.

Suitable System

Referring to FIG. 1, a block diagram illustrating components of a data stream utilized by a suitable data storage system, such as a system that performs network attached storage, is shown. The stream 110 may include a client 111, a media agent 112, and a secondary storage device 113. For example, in storage operations, the system may store, receive and/or prepare data, such as blocks or chunks, to be stored, copied or backed up at a server or client 111. The system may then transfer the data to be stored to media agent 112, which may then refer to storage policies, schedule policies, and/retention policies (and other policies) to choose a secondary storage device 113, such as a NAS device that receives data and transfers data to attached secondary storage devices. The media agent 112 may include or be associated with a NAS device, to be discussed herein.

The secondary storage device 113 receives the data from the media agent 112 and stores the data as a secondary copy, such as a backup copy. Secondary storage devices may be magnetic tapes, optical disks, USB and other similar media, disk and tape drives, and so on. Of course, the system may employ other configurations of stream components not shown in the Figure.

Figure 2:
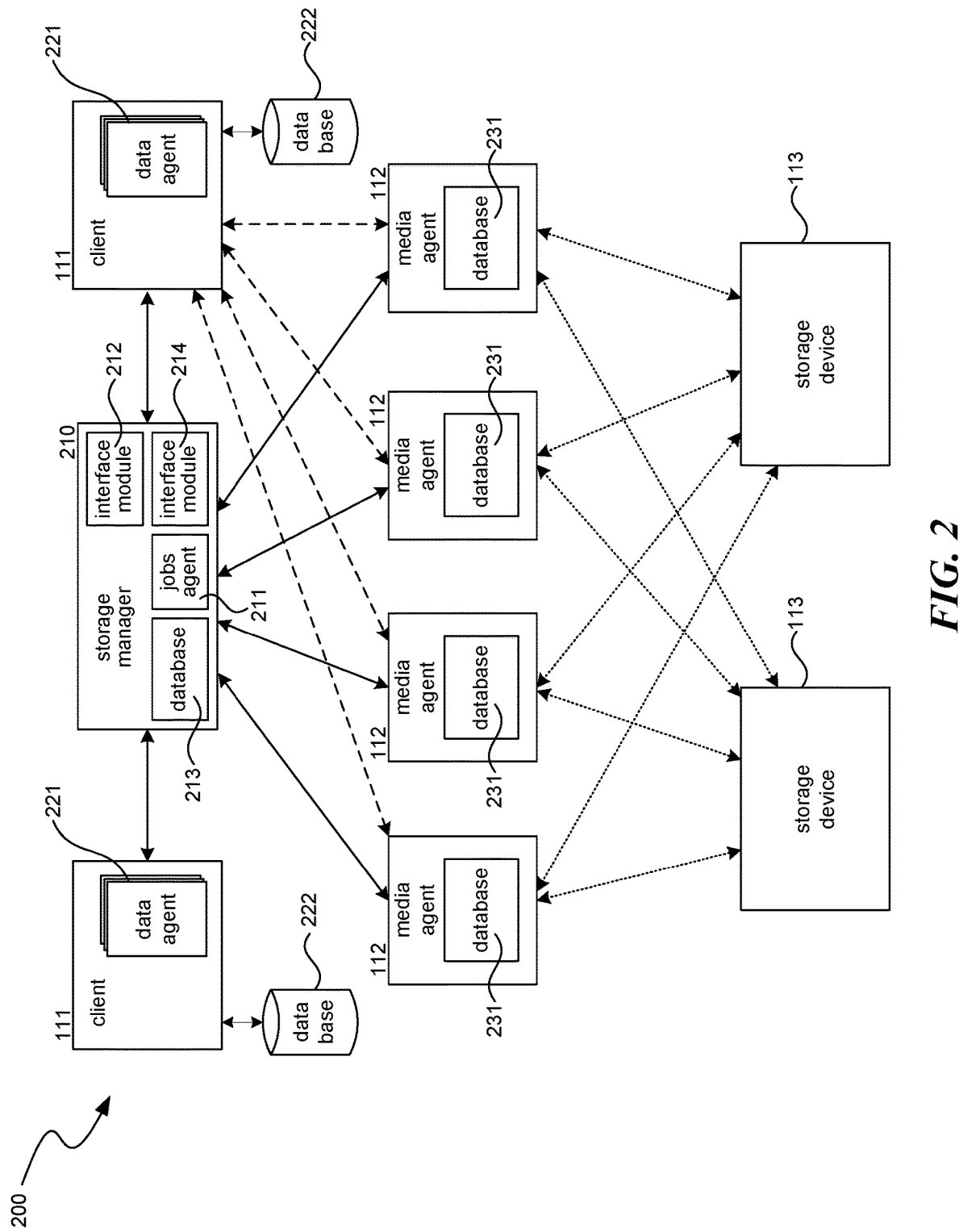
FIG. 2 is a block diagram illustrating an example of a data storage system.

Referring to FIG. 2, a block diagram illustrating an example of a data storage system 200 is shown. Data storage systems may contain some or all of the following components, depending on the needs of the system. FIG. 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including tangible storage media, such as magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. The storage devices 113 may include network attached storage, such as the NAS devices described herein. Client databases 222 may contain data files and other information, while media agent databases may contain indices and other data structures that assist and implement the storage of data into secondary storage devices, for example.

The data storage and recovery system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies of data. Additionally, some resources may create indices and other tables relied upon by the data storage system and other data recovery systems. The secondary copies may include snapshot copies and associated indices, but may also include other backup copies such as HSM copies, archive copies, auxiliary copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
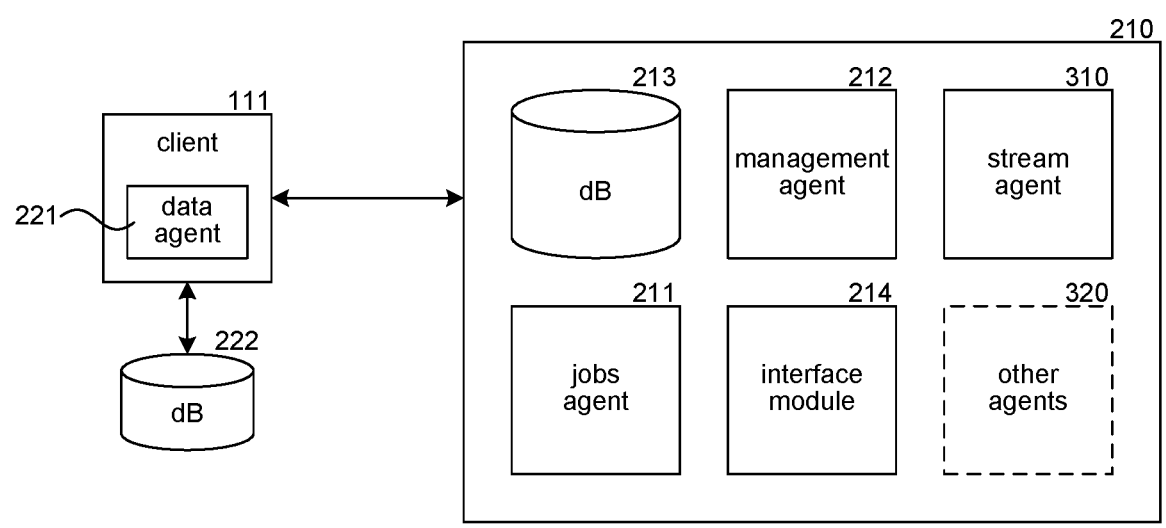
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to storage media. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Suitable Storage Devices

Figure 4:
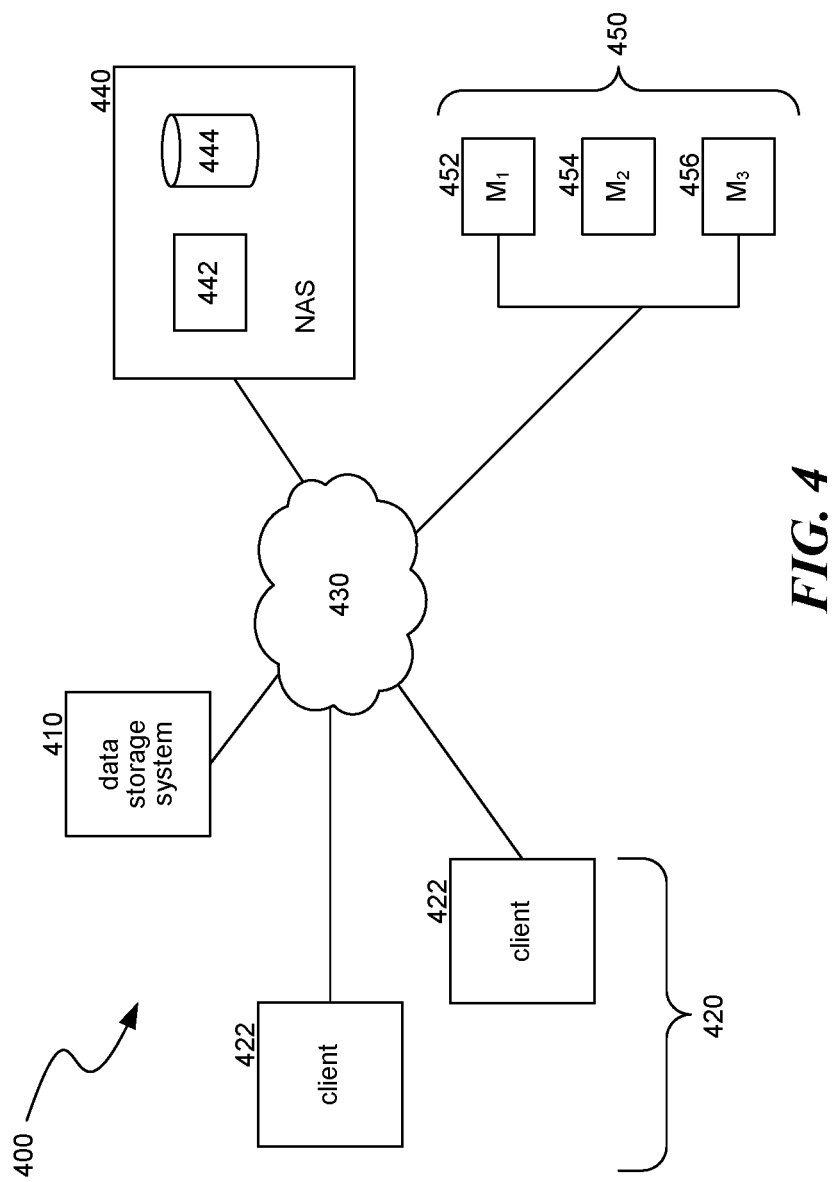
FIG. 4 is a block diagram illustrating a NAS device within a networked computing system.

Referring to FIG. 4, a block diagram illustrating components of a networked data storage device, such as a filer or NAS device 440, configured to perform data migration within a networked computing system is shown. (While the examples below discuss a NAS device, any architecture or networked data storage device employing the following principles may be used, including a proxy computer coupled to the NAS device). The computing system 400 includes a data storage system 410, such as the tiered data storage system 200. Client computers 420, including computers 422 and 424, are associated with users that generate data to be stored in secondary storage. The client computers 422 and 424 communicate with the data storage system 410 over a network 430, such as a private network such as an Intranet, a public network such as the Internet, and so on. The networked computing system 400 includes network attached storage, such as NAS device 440. The NAS device 440 includes NAS-based storage or memory, such as a cache 444, for storing data received from the network, such as data from client computers 422 and 424. (The term "cache" is used generically herein for any type of storage, and thus the cache 444 can include any type of storage for storing of data files within the NAS device, such as magnetic disk, optical disk, semiconductor memory, or other known types of storage such as magnetic tape or types of storage hereafter developed.) The cache 444 may include an index or other data structure in order to track where data is eventually stored or the index may be stored elsewhere, such as on the proxy computer. The index may include information associating the data with information identifying a secondary storage device that stored the data, or other information. For example, as described in detail below, the index may include both an indication of which blocks have been written to secondary storage (and where they are stored in secondary storage), and a look up table that maps blocks to individual files stored within the NAS and NAS device 440.

The NAS device 440 also includes a data migration component 442 that performs data migration on data stored in the cache 444. While shown in FIG. 4 as being within the NAS device 440, the data migration component 442 may be on a proxy computer coupled to the NAS device. In some cases, the data migration component 442 is a device driver or agent that performs block-level data migration of data stored in the cache. In some cases, the data migration component 442 performs chunk-based data migration of data stored in the cache. Additionally, in some cases the data migration component 442 may perform file-based data migration, or a combination of two or more types of data migration, depending on the needs of the system. During data migration, the NAS device transfers data from the cache of the device to one or more secondary storage devices 450 located on the network 430, such as magnetic tapes 452, optical disks 454, or other secondary storage 456. The NAS device may include various data storage components when identifying and transferring data from the cache 444 to the secondary storage devices 450. These components will now be discussed.

Figure 5:
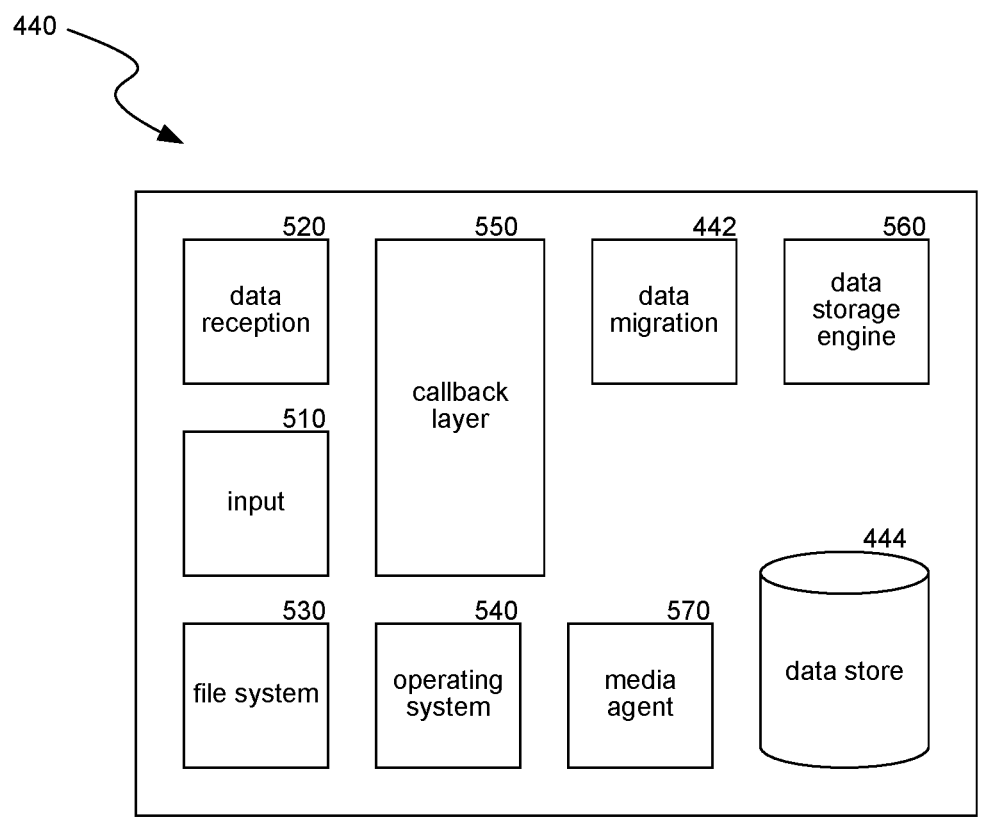
FIG. 5 is a block diagram illustrating the components of a NAS device configured to perform data migration.

Referring to FIG. 5, a block diagram illustrating the components of a NAS device 440 configured to perform data migration is shown. In addition to a data migration component 442 and cache 444, the NAS device 440 may include an input component 510, a data reception component 520, a file system 530, and an operating system 540. The input component 510 may receive various inputs, such as via an iSCSI protocol. That is, the NAS device may receive commands or control data from a data storage system 410 over IP channels. For example, the data storage system 410 may send commands to a NAS device's IP address in order to provide instructions to the NAS device. The data reception component 520 may receive data to be stored over multiple protocols, such as NFS, CIFS, and so on. For example, a UNIX based system may send data to be stored to the NAS device over a NFS communication channel, while a Windows based system may send data to be stored to the NAS device over a CIFS communication channel.

Additionally, the NAS device 440 may include a number of data storage resources, such as a data storage engine 560 to direct reads from writes to the data store 444, and one or more media agents 570. The media agents 570 may be similar to the media agents 112 described herein. In some cases, the NAS device 440 may include two or more media agents 570, such as multiple media agents 570 externally attached to the NAS device 440. The NAS device 440 may expand its data storage capabilities by adding media agents 570, as well as other components.

As discussed herein, the NAS device 440 includes a data migration component capable of transferring some or all of the data stored in the cache 442. In some examples, the data migration component 442 requests and/or receives information from a callback layer 550, or other intermediate component, within the NAS device 440. Briefly, the callback layer 550 intercepts calls for data between the file system 530 and the cache 444, and tracks these calls to provide information to the data migration component 442 regarding when data is changed, updated, and/or accessed by the file system 530. Further details regarding the callback layer 550 and other intermediate components will now discussed.

In some examples, the NAS device monitors the transfer of data from the file system 530 to the cache 444 via the callback layer 550. The callback layer 550 not only facilitates the migration of data portions from data storage on the NAS device to secondary storage, but also facilitates read back or callback of that data from the secondary storage back to the NAS device. While described at times herein as a device driver or agent, the callback layer 550 may be a layer, or additional file system, that resides on top of the file system 530. The callback layer 550 may intercept data requests from the file system 530, in order to identify, track and/or monitor data requested by the file system 530 and store information associated with these requests in a data structure, such as a bitmap similar to the one shown in Table 1. Thus, the callback layer stores information identifying when a data portion is accessed by tracking calls from the file system 530 to the cache 530. For example, Table 1 provides entry information that tracks calls to a data store:

TABLE 1

| Chunk of File1 | Access Time |
| --- | --- |
| File1.1 | Sep. 5, 2008 @12:00 |
| File1.2 | Sep. 5, 2008 @12:30 |
| File1.3 | Sep. 5, 2008 @13:30 |
| File1.4 | Jun. 4, 2008 @ 12:30 |

In this example, the file system 530 creates a data object named "File1," using a chunking component (described herein) to divide the file into four chunks: "File1.1," "File1.2," "File1.3," and "File1.4." The file system 530 stores the four chunks to the cache 444 on Jun. 4, 2008. According to the table, the file system can determine that it has not accessed chunk File1.4 since its creation, and most recently accessed the other chunks on Sep. 5, 2008. Of course, Table 1 may include additional, other or different information, such as information identifying a location of the chunks, information identifying the type of media storing the chunks, information identifying the blocks within the chunk, and/or other information or metadata.

Thus, providing data migration to the NAS device enables the device to facilitate inexpensive, transparent storage to a networked computing system, to free up storage space by migrating or archiving stale data to other locations, among other benefits. Of course, non-networked computing systems may also store data to the NAS devices described herein. Because the NAS devices described herein can be easily and quickly installed on networks, they provide users, such as network administrators, with a quick and efficient way to expand their storage capacity without incurring the typical costs associated with typical NAS devices that do not perform data migration.

For example, adding a NAS device described herein to an existing networked computing system can provide the computing system with expanded storage capabilities, but can also provide the computing system with other data storage functionality. In some examples, the NAS device described herein includes a data storage engine (e.g., a common technology engine, or CTE, provided by Commvault Systems, Inc. of Oceanport, N.J.), the NAS device may act as a backup server. For example, such a device may perform various data storage functions normally provided by a backup server, such as single instancing, data classification, mirroring, content indexing, data backup, encryption, compression, and so on. Thus, in some examples, the NAS device described herein acts as a fully functional and independent device an administrator can attach to a network to perform virtually any data storage function.

Also, in some cases, the NAS device described herein may act to perform fault tolerance in a data storage system. For example, the clustering of NAS devices on a system may provide a higher level of security, because processes on one device can be replicated on another. Thus, attaching two or more of the NAS devices described herein may provide an administrator with the redundancy or security required in some data storage systems.

Data Migration in Storage Devices

As described herein, in some examples, the NAS device leverages block-level or chunk-based data migration in order to provide expanded storage capabilities to a networked computing system.

Block-level migration, or block-based data migration, involves migrating disk blocks from the data store or cache 444 to secondary media, such as storage devices 550. Using block-level migration, the NAS device 440 transfers blocks from the cache that have not been recently accessed to secondary storage, freeing up space on the cache.

Figure 6:
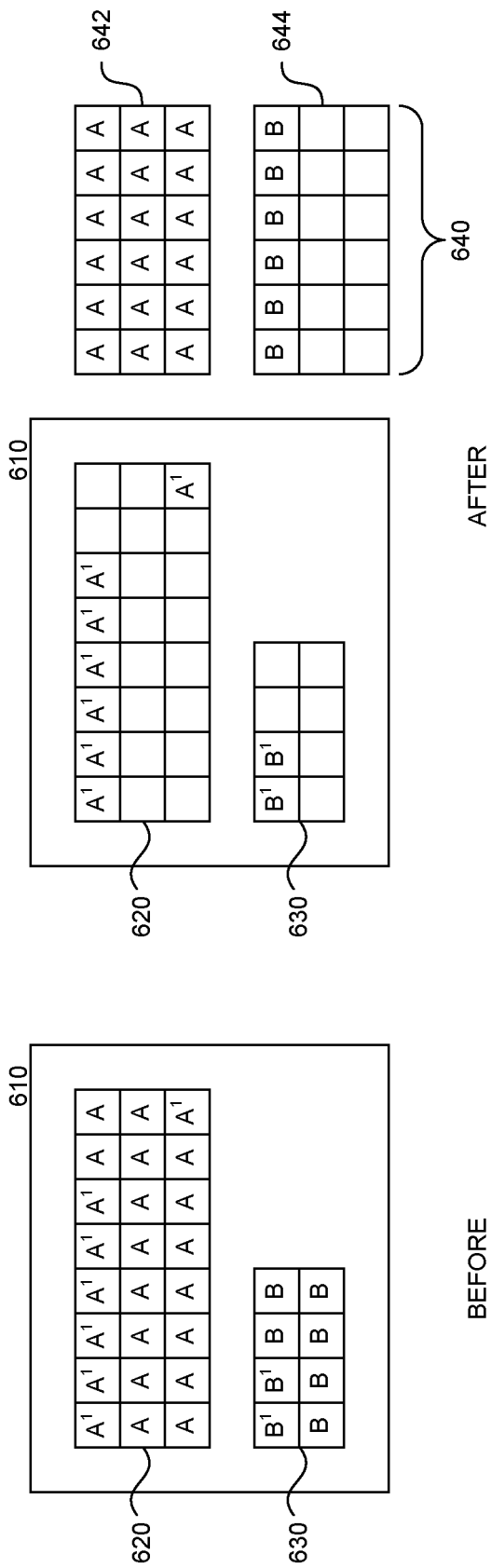
FIGS. 6A and 6B are schematic diagrams illustrating a data store before and after a block-based data migration, respectively.

As described above, the system can transfer or migrate certain blocks of a data object from one data store to another, such as from a cache in a NAS device to secondary storage. Referring to FIGS. 6A-6B, a schematic diagram illustrating contents of two data stores before and after a block-based data migration is shown. In FIG. 6A, a first data store 610 contains primary copies (i.e., production copies) of two data objects, a first data object 620 and a second data object 630. The first data object comprises blocks A and $A^1$, where blocks A are blocks that satisfy or meet certain storage criteria (such as blocks that have not been modified since creation or not been modified within a certain period of time) and blocks A' are blocks that do not meet the criteria (such as blocks that have been modified within the certain time period). The second data object comprises blocks B and B', where blocks B satisfy the criteria and blocks B' do not meet the criteria.

FIG. 6B depicts the first data store 610 after a block-based data migration of the two data objects 620 and 630. In this example, the system only transfers the data from blocks that satisfy a criteria (blocks A and B) from the first data store 610 to a second data store 640, such as secondary storage 642, 644. The secondary storage may include one or more magnetic tapes, one or more optical disks, and so on. The system maintains data in the remaining blocks (blocks A' and B') within the first data store 610.

The system can perform file system data migration at a block level, unlike previous systems that only migrate data at the file level (that is, they have a file-level granularity). By tracking migrated blocks, the system can also restore data at the block level, which may avoid cost and time problems associated with restoring data at the file level.

Figure 7:
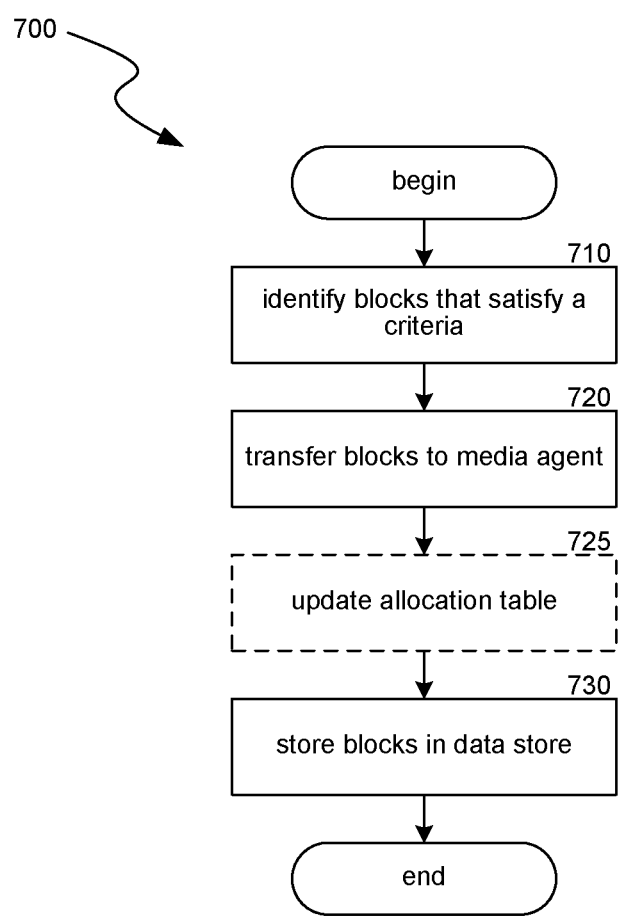
FIG. 7 is a flow diagram illustrating a routine for performing block-level data migration in a NAS device.

Referring to FIG. 7, a flow diagram illustrating a routine 700 for performing block-level data migration in a NAS device is shown. In step 710, the NAS device, via the data migration component 442, identifies data blocks within a cache that satisfy a certain criteria. The data migration component 442 may compare some or all of the blocks (or, information associated with the blocks) in the cache with predetermined criteria. The predetermined criteria may be time-based criteria within a storage policy or data retention policy.

In some examples, the data migration component 442 identifies blocks set to be "aged off" from the cache. That is, the data migration component 442 identifies blocks created, changed, or last modified before a certain date and time. For example, the system may review a cache for all data blocks that satisfy a criterion or criteria. The data store may be an electronic mailbox or personal folders (.pst) file for a Microsoft Exchange user, and the criterion may define, for example, all blocks or emails last modified or changed thirty days ago or earlier. The component 442 compares information associated with the blocks, such as metadata associated with the blocks, to the criteria, and identifies all blocks that satisfy the criteria. For example, the component 442 identifies all blocks in the .pst file not modified within the past thirty days. The identified blocks may include all the blocks for some emails and/or a portion of the blocks for other emails. That is, for a given email (or data object), a first portion of the blocks that include the email may satisfy the criteria, while a second portion of the blocks that include the same email may not satisfy the criteria. In other words, a file or a data object can be divided into parts or portions, and only some of the parts or portions change.

To determine which blocks have changed, and when, the NAS device can monitor the activity of a NAS device's file system 530 via the callback layer 550. The NAS device may store a data structure, such as a bitmap, table, log, and so on within the cache 444 or other memory in the NAS device or elsewhere, and update the data structure whenever the file system calls the cache 444 to access and update or change data blocks within the cache 444. The callback layer 550 traps commands to the cache 444, where that command identifies certain blocks on a disk for access or modifications, and writes to the data structure the changed blocks and the time of the change. The data structure may include information such as an identification of changed blocks and a date and a time the blocks were changed. The data structure, which may be a table, bitmap, or group of pointers, such as a snapshot, may also include other information, such as information that maps file names to blocks, information that maps chunks to blocks and/or file names, and so on, and identify when accesses/changes were made. Table 2 provides entry information for tracking the activity of a file system with the "/users" directory:

TABLE 2

| Blocks | Date and Time Modified |
| --- | --- |
| /users/blocks1-100 | Sep. 8, 2008 @14:30 |
| /users/blocks101-105 | Sep. 4, 2008 @12:23 |
| /users2/blocks106-110 | Sep. 4, 2008 @11:34 |
| /users3/blocks110-1000 | Aug. 5, 2008 @10:34 |

Thus, if a storage policy identified the time Aug. 30, 2008 @ 12:00 as a threshold time criteria, where data modified after the time is to be retained, the system would identify, in step 710, blocks 110-1000 as having satisfied the criteria. Thus, the system, via the intermediate component 420, can monitor what blocks are requested by a file system, and act accordingly, as described herein.

In step 720, the NAS device transfers data within the identified blocks from the cache to a media agent 570, to be stored in a different data store. The system may perform some or all of the processes described with respect to FIGS. 1-3 when transferring the data to the media agent. For example, before transferring data, the system may review a storage policy as described herein to select a media agent, such as media agent 112, based on instructions within the storage policy. In step 725, the system optionally updates an allocation table, such as a file allocation table (FAT) for the file system 530 associated with the NAS device, to indicate the data blocks that no longer contain data and are now free to receive and store data from the file system.

In step 730, via the media agent 570, the NAS device 440 stores data from the blocks to a different data store. In some cases, the NAS device, via the media agent 570, stores the data from the blocks to a secondary storage device, such as a magnetic tape 452 or optical disk 454. For example, the NAS device may store the data from the blocks in secondary copies of the data store, such as a backup copy, an archive copy, and so on.

The NAS device may create, generate, update, and/or include an allocation table, (such as a table for the data store) that tracks the transferred data and the data that was not transferred. The table may include information identifying the original data blocks for the data, the name of the data object (e.g., file name), the location of any transferred data blocks (including, e.g., offset information), and so on. For example, Table 3 provides entry information for an example .pst file:

TABLE 3

| Name of Data Object | Location of data |
| --- | --- |
| Email1 | C:/users/blocks1-100 |
| Email2.1 (body of email) | C:/users/blocks101-120 |
| Email2.2 (attachment) | X:/remov1/blocks1-250 |
| Email3 | X:/remov2/blocks300-500 |

In the above example, the data for "Email2" is stored in two locations, the cache (C:/) and an off-site data store (X:/). The system maintains the body of the email, recently modified or accessed, at a location within a data store associated with a file system, "C:/users/blocks101-120." The system stores the attachment, not recently modified or accessed, in a separate data store, "X:/remov1/blocks1-250." Of course, the table may include other information, fields, or entries not shown. For example, when the system stored data to tape, the table may include tape identification information, tape offset information, and so on.

Chunked file migration, or chunk-based data migration, involves splitting a data object into two or more portions of the data object, creating an index that tracks the portions, and storing the data object to secondary storage via the two or more portions. Among other things, the chunk-based migration provides for fast and efficient storage of a data object. Additionally, chunk-based migration facilitates fast and efficient recall of a data object, such as the large files described herein. For example, if a user modifies a migrated file, chunk-based migration enables a data restore component to only retrieve and migrate back to secondary storage the chunk containing the modified portion of the file, and not the entire file.

As described above, in some examples the NAS device migrates chunks of data (sets of blocks) that comprise a data object from the cache 444 to another. A data object, such as a file, may comprise two or more chunks. A chunk may be a logical division of a data object. For example, a .pst file may include two or more chucks: a first chunk that stores associated with an index of a user's mailbox, and one or more chunks that stores email, attachments, and so on within the user's mailbox. A chunk is a proper subset of all the blocks that contain a file. That is, for a file contained or defined by n blocks, the largest chunk of the file contains at most n−1 blocks.

In some cases, the data migration component 442 may include a chunking component that divides data objects into chunks. The chunking component may receive files to be stored in the cache 444, divide the files into two or more chunks, and store the files as two or more chunks in the cache. The chunking component may update an index that associated information associated with files with the chunks of the file, the data blocks of the chunks, and so on.

The chunking component may perform different processes when determining how to divide a data object. For example, the chunking component may include indexing, header, and other identifying information or metadata in a first chunk, and include the payload in other chunks. The chunking component may identify and/or retrieve file format or schema information from an index, FAT, NFS, or other allocation table in the file system to determine where certain chunks of a data object reside (such as the first or last chunk of a large file). The chunking component may follow a rules-based process when dividing a data object. The rules may define a minimum or maximum data size for a chunk, a time of creation for data within a chunk, a type of data within a chunk, and so on.

For example, the chunking component may divide a user mailbox (such as a .pst file) into a number of chunks, based on various rules that assign emails within the mailbox to chunks based on the metadata associated with the emails. The chunking component may place an index of the mailbox in a first chunk and the emails in other chunks. The chunking component may then divide the other chunks based on dates of creation, deletion or reception of the emails, size of the emails, sender of the emails, type of emails, and so on. Thus, as an example, the chunking component may divide a mailbox as follows:

| | |
|---|---|
| User1/Chunk1 | Index |
| User1/Chunk2 | Sent emails |
| User1/Chunk3 | Received emails |
| User1/Chunk4 | Deleted emails |
| User1/Chunk5 | All Attachments. |

Of course, other divisions are possible. Chunks may not necessarily fall within logical divisions. For example, the chunking component may divide a data object based on information or instructions not associated with the data object, such as information about data storage resources, information about a target secondary storage device, historical information about previous divisions, and so on.

Figure 8:
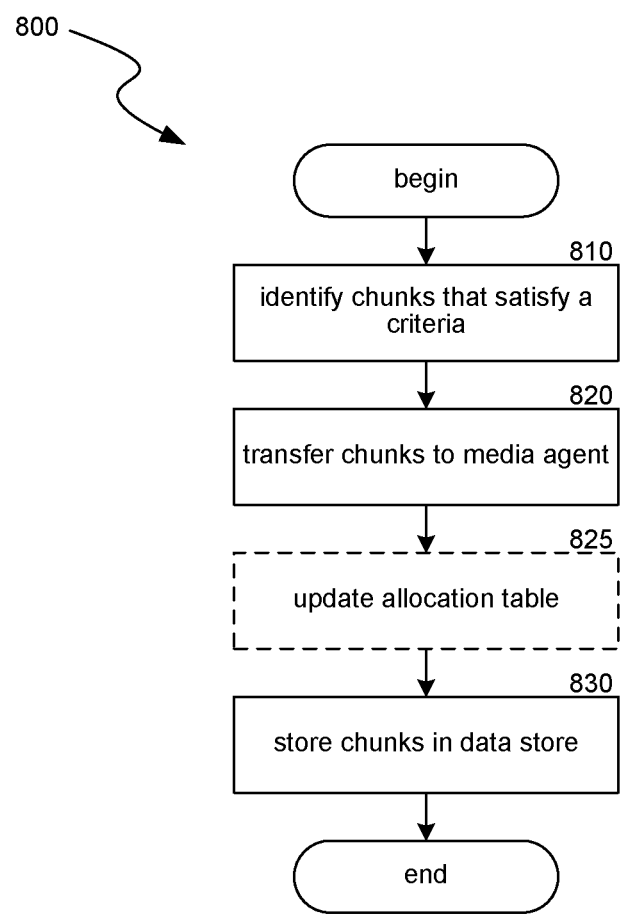
FIG. 8 is a flow diagram illustrating a routine for performing chunk-level data migration in a NAS device.

Referring to FIG. 8, a flow diagram illustrating a routine 800 for performing chunk-level data migration in a NAS device is shown. In step 810, the system identifies chunks of data blocks within a data store that satisfy one or more criteria. The data store may store large files (>50 MB), such as databases associated with a file system, SQL databases, Microsoft Exchange mailboxes, virtual machine files, and so on. The system may compare some or all of the chunks (or, information associated with the chunks) of the data store with predetermined and/or dynamic criteria. The predetermined criteria may be time-based criteria within a storage policy or data retention policy. The system may review an index with the chunking component 815 when comparing the chunks with applicable criteria.

In step 820, the NAS device transfers data within the identified chunks from the data store to a media agent, to be stored in a different data store. The NAS device may perform some or all of the processes described with respect to FIGS. 1-3 when transferring the data to the media agent. For example, the NAS device may review a storage policy assigned to the data store and select a media agent based on instructions within the storage policy. In step 825, the system optionally updates an allocation table, such as a file allocation table (FAT) for a file system associated with the NAS device, to indicate the data blocks that no longer contain data and are now free to receive and store data from the file system.

In step 930, via one or more media agents 570, the NAS device 440 stores the data from the chunks to a different data store. In some cases, the system, via the media agent, stores the data to a secondary storage device, such as a magnetic tape or optical disk. For example, the system may store the data in secondary copies of the data store, such as a backup copy, and archive copy, and so on.

Data Recovery in Storage Devices

Figure 9:
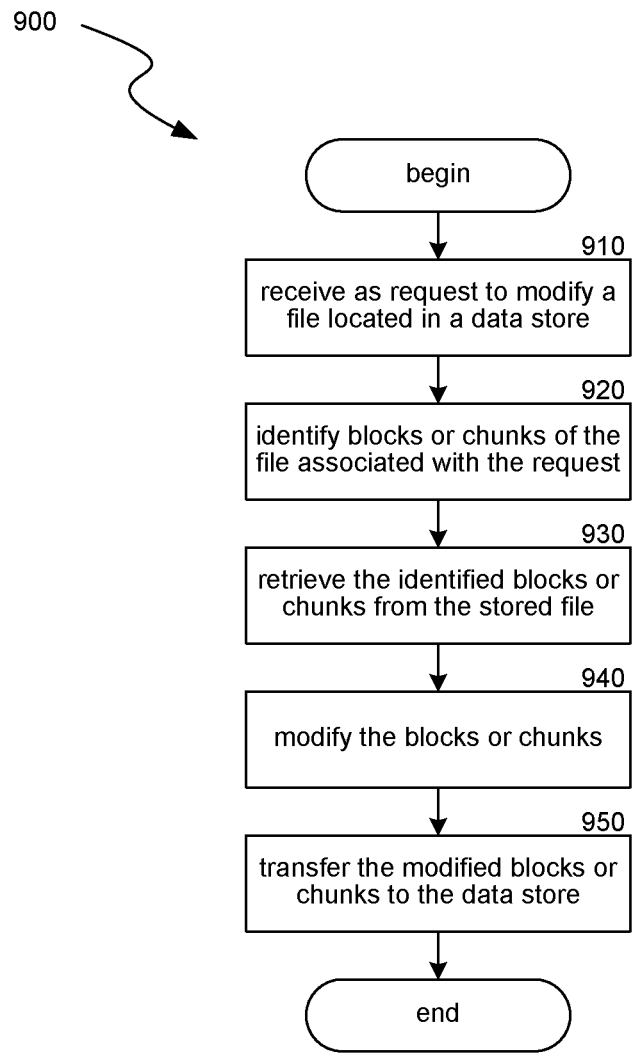
FIG. 9 is flow diagram illustrating a routine for block-based or chunk-based data restoration and modification via a NAS device.

A data storage system, using a NAS device leveraging the block-based or chunk-based data migration processes described herein, is able to restore portions of files instead of entire files, such as individual blocks or chunks that comprise portions of the files. Referring to FIG. 9, a flow diagram illustrating a routine 900 for block-based or chunk-based data restoration and modification is shown. In step 910, the system, via a restore or data recovery component, receives a request to modify a file located in a cache of a NAS device or in secondary storage in communication with a NAS device. For example, a user submits a request to a file system to provide an old copy of a large PowerPoint presentation so the user can modify a picture located on slide 5 of 300 of the presentation.

In step 920, the system identifies one or more blocks or one or more chunks associated with the request. For example, the callback layer 550 of the system looks to a table similar to Table 3, identifies blocks associated with page 5 of the presentation and blocks associated with a table of contents of the presentation, and contacts a NAS device that stored or migrated the blocks on secondary storage.

In step 930, the system, via the NAS device, retrieves the identified blocks or chunks from the secondary storage and presents them to the user. For example, the system only retrieves page 5 and table of contents of the presentation and presents the pages to the user.

In step 940, the system receives input from a user to modify the retrieved blocks or chunks. For example, the user updates the PowerPoint presentation to include a different picture. In step 950, the system transfers data associated with the modified blocks or chunks back to the NAS device, where it remains in a cache or is transferred to secondary storage. For example, the system transfers the modified page 5 to the data store. The system may also update a table that tracks access to the data store, such as Table 1 or Table 3.

Thus, the system, leveraging block-based or chunk-based data migration in a NAS device, restores only portions of data objects required by a file system. Such restoration can be, among other benefits, advantageous over systems that perform file-based restoration, because those systems restore entire files, which can be expensive, time consuming, and so on. Some files, such as .pst files, may contain large amounts of data. File-based restoration can therefore be inconvenient and cumbersome, among other things, especially when a user only requires a small portion of a large file.

For example, a user submits a request to the system to retrieve an old email stored in a secondary copy on removable media via a NAS device. The system identifies a portion of a .pst file associated with the user that contains a list of old emails in the cache of the NAS device, and retrieves the list. That is, the system has knowledge of the chunk that includes the list (e.g., a chunking component may always include the list in a first chunk of a data object), accesses the chunk, and retrieves the list. The other portions (e.g., all the emails with the .pst file), were transferred from the NAS device secondary storage. The user selects the desired email from the list. The NAS device, via an index in the cache that associates chunks with data or files (such as an index similar to Table 3), identifies the chunk that contains the email, and retrieves the chunk from associate secondary storage for presentation to the user. Thus, the NAS device is able to restore the email without restoring the entire mailbox (.pst file) associated with the user.

As noted above, the callback layer 550 maintains a data structure that not only tracks where a block or chunk resides on secondary storage, but also which file was affected based on the migration of that block or chunk. Portions of large files may be written to secondary storage to free up space in the data store 444 of the NAS device 440. Thus, to the network, the total data storage of the NAS device is much greater than that actually available within the data store 444. For example, while the data store 444 may have only a 100 gigabyte capacity, its capacity may actually appear as 300 gigabytes, with over 200 gigabytes migrated to secondary storage.

To help ensure sufficient space to write back data from secondary storage to the data store 444 of the NAS device 440, the data store may be partitioned to provide a callback or read-back cache. For example, a disk cache may be established in the data store 444 of the NAS device 440 for the NAS device to write back data read from secondary storage. The amount of the partition is configurable, and may be, for example, between 5 and 20 percent of the total capacity of the data store 440. In the above example, with a 100 gigabyte data store 444, 10 gigabytes may be reserved (10 percent) for data called back from secondary storage to the NAS device 440. This disk partition or callback cache can be managed in known ways, such that data called back to this disk partition can have the oldest data overwritten when room is needed to write new data.

CONCLUSION

From the foregoing, it will be appreciated that specific examples of the data recovery system have been described herein for purposes of illustration, but that various modifications may be made without deviating from the spirit and scope of the system. For example, although files have been described, other types of content such as user settings, application data, emails, and other data objects can be imaged by snapshots. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the applicant contemplates the various aspects of the system in any number of claim forms. For example, while only one aspect of the system is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the system.

We claim:

1. A network attached storage (NAS) device, wherein the network attached storage device is configured to be connected to a networked computing system, and wherein the networked computing system includes one or more non-volatile secondary data storage devices and one or more client computers connected via a network, the network attached storage device comprising:

a housing containing one or more components, the components including:

a data reception component, wherein the data reception component is configured to receive for storage multiple data files from the one or more client computers via the network;

an operating system, wherein the operating system is configured to provide a computing environment for the network attached storage device;

at least one processor, wherein the at least one processor is programmed to perform one or more data storage functions for the network attached storage device;

a non-volatile data store, wherein the non-volatile data store is configured to store the data files received from the data reception component;

a data interception component, wherein the data interception component is configured to intercept data transferred from the data reception component to the non-volatile data store and to update an index associating information identifying the transferred data with information identifying a time of transfer to the non-volatile data store;

a file system, wherein the file system is configured to manage, for the network attached storage device, the writing of data files to, and the reading of data files from, the non-volatile data store;

one or more media agents, wherein the one or more media agents are configured to receive instructions from the at least one processor and to transfer data stored in the non-volatile data store of the network attached storage device to the one or more non-volatile secondary data storage devices, wherein the one or more non-volatile secondary data storage devices are external to the network attached storage device but are accessible by the one or more media agents of the network attached storage device via the network; and a data migration component, wherein the data migration component is configured to identify portions of at least some of the data files within the non-volatile data store, and to migrate the identified data file portions from the network attached storage device to the one or more non-volatile secondary data storage devices, to thereby free up storage space in the non-volatile data store for the storage of one or more other data files, wherein each of the data files is an individual file, wherein the identified data file portions are less than all of the selected data file, wherein the identified data file portions are for storage by the one or more media agents to at least one of the one or more non-volatile secondary storage devices, wherein the data migration component is further configured to identify portions of a selected data file within the non-volatile data store based at least in part on a data storage criterion, wherein the data storage criterion is associated with writing data to, and reading data from, portions of the selected data file, wherein the data storage criterion includes data file portions that have not been modified within a predetermined period of time, and, wherein the data migration component maintains a data structure that:

tracks a logical location of the identified data file portions stored in the one or more secondary storage devices, and maps the identified data file portions to the selected data file.

2. The network attached storage device of claim 1, further comprising:

a data interception component, wherein the data interception component is configured to intercept access requests from the file system to the non-volatile data store and to update an index associating information identifying the access requests with information identifying a time of the access requests.

3. The network attached storage device of claim 1, wherein the data files consist of multiple blocks and wherein the data migration component identifies at least one block for migration from the network attached storage device, but not all of the multiple blocks, wherein the one block has an oldest access time as compared to other of the multiple blocks.

4. The network attached storage device of claim 1, wherein the data migration component is configured to identify data blocks in the non-volatile data store that have not been accessed by the file system within a predetermined time period.

5. The network attached storage device of claim 1 wherein the non-volatile data store further comprising a reserved read-back cache, and wherein the network attached storage device further comprises a callback component configured to read back the identified data file portions stored in the one or more secondary storage devices and to write the identified data file portions to the read-back cache, wherein the callback component is configured to read back the identified data file portions in response to a receipt of a request from the one or more client computers to access the identified data file portions.

6. A computer-implemented method for tracking at least a first portion of at least one data object within a network attached storage (NAS) device coupled to a network, wherein the NAS device includes a NAS file system and a non-volatile data store, the method comprising:

accessing calls to or from the NAS file system for reading of data from or writing of data to the non-volatile data store of the NAS device, wherein the at least one data object consists of multiple data blocks, wherein each data object is a single data object, wherein the non-volatile data store of the NAS device stores the multiple data blocks of the data object;

wherein the NAS file system controls the reading of data from or the writing of data to the multiple data blocks of the data object, and wherein the accessing includes identifying individual blocks or groups of blocks within the multiple data blocks of the data object that the NAS file system reads data from or writes data to, wherein the identified individual blocks or groups of blocks are less that the entire data object;

based on the accessing, identifying a portion of the multiple data blocks of the data object that satisfies a data storage criterion, wherein the data storage criterion filters for the portion of the multiple data blocks that has not been modified since creation or that has not been modified within a predetermined period of time;

causing data stored in the portion of the multiple data blocks to be transferred to a separate non-volatile storage device, so as to free up available data storage on the NAS device for storage of other data objects, wherein the separate storage device is not contained by or within the NAS device but communicates with the NAS device over the network, wherein the network is a private network;

based on the identifying, and independently of the NAS file system of the NAS device,
updating a data structure, wherein the data structure, tracks the portion of the multiple data blocks, and provides an indication of the data object to which the portion of the multiple data blocks belongs;
updating the data structure to include information associating the portion of the multiple data blocks with the separate storage device,
wherein the data structure is an index is stored in the non-volatile data store of the NAS device; and
removing information from an allocation table associated with the NAS file system of the NAS device,
wherein the data object is a file, and wherein the portion of the multiple data blocks is less than all of the multiple data blocks for the file.

7. The method of claim 6,
wherein the separate storage device is not contained by or within the NAS device but communicates with the NAS device over the network, the method further comprising: updating the data structure to track a location of the portion of the multiple data blocks as being located in the separate storage device.

8. The method of claim 6, wherein the data storage criterion comprises a time period in which to retain data in a cache of the NAS device, or a time period in which a recent access of the portion must occur of the multiple data blocks.

9. A stand-alone data storage device, coupled to one or more external computing devices over a network, wherein at least one non-volatile external storage device is also connected to the data storage device via the network, the data storage device comprising:
at least one processor;
a communication component coupled to the at least one processor and associated with a network address for the data storage device,
wherein the communication component receives data transfer commands from the one or more external computing devices on the network,
wherein the one or more external computing devices direct the data transfer commands to the data storage device via the network address for the data storage device, and
wherein the data transfer commands direct operation of the data storage device;
a non-volatile, internal data store, coupled to the at least one processor, wherein the internal data store stores data objects, wherein the data objects are comprised of multiple data blocks;
a data storage component that comprises program code, which when executed by the processor, performs data storage tasks with respect to the internal data store;
a file system that comprises program code, which when executed by the processor, stores and organizes data objects stored in the internal data store;
a call intercept layer, in communication with the file system, that comprises program code, which when executed by the processor, recognizes calls to or from the file system for reading of data from or writing of data to individual data blocks or groups of data blocks stored within the internal data store;
a data block identification component, in communication with the call intercept layer, that comprises program code, which when executed by the processor, identifies data blocks of the data object that satisfy a criterion, wherein the criterion is associated with the recognized calls to or from the file system for the reading of data from or the writing of data to the individual data blocks or groups of data blocks,
wherein the criterion defines data blocks of the data object that have not been modified since creation or data blocks of the data object that have not been modified within a predetermined period of time,
wherein the identified data blocks of the data object are less than the whole data object;
an index component that comprises program code, which when executed by the processor, updates an index to include information associating the identified data blocks with information identifying the data object; and
a media agent, in communication with the data block identification component, that comprises program code, which when executed by the processor, copies or transfers, via the network and to the external storage device, data for no more than n−1 identified data blocks to free up storage space on the data storage device for one or more other data objects, wherein at least one data object includes n number of data blocks.

10. The data storage device of claim 9 wherein at least one data object is a file having n number of data blocks,
wherein the index component includes a bitmap or a data location table mapping the no more than n−1 identified data blocks to a logical location on the network.

11. The data storage device of claim 9 wherein at least one data object is a file having n number of data blocks, and
wherein the index component updates the index to include information associating the transferred data with information identifying tape offsets for the secondary storage device that contains the transferred data.

12. The data storage device of claim 9, wherein the criterion defines a time period related to when the file system last read data from or wrote data to individual data blocks or groups of data blocks.

13. The data storage device of claim 9, wherein the criterion defines a time period in which changes were made to data contained by blocks of the data object.

14. A network attached storage device, comprising:
a non-transitory cache, wherein the cache stores one or more data objects;
a media agent, wherein the media agent is configured to transfer portions of the one or more data objects from the cache to associated non-volatile secondary storage devices, wherein the transferring frees up storage space in the non-transitory cache for one or more other data objects to be stored at a location previously occupied by the portions of the one or more data objects,
wherein the portions of the one or more data objects are less than any one of the one or more data objects, and
wherein the secondary storage devices are located external to the network attached storage device and configured to provide long term storage of data; and
a data identification component, wherein the data identification component is configured to identify to the media agent the portions of the data objects to be transferred to the secondary storage devices based on one or more storage criteria, and
wherein the one or more storage criteria are met by the portions of the data objects that have not been modified since their creation, or the portions of the data objects that have not been modified within a predetermined period of time; and
an intermediate component, wherein the intermediate component tracks in an index all accesses of the one or more data objects by a file system within the network attached storage device, and wherein the data identification component identifies the portions of the data objects based on information within the index.

15. The network attached storage device of claim 14, wherein the identified portions are proper subsets of data blocks of the data objects.

16. The network attached storage device of claim 14, wherein the identified portions include chunks of the data objects created from a rule-based process of dividing the data object into two or more portions.

* * * * *